United States Patent [19]

Beight et al.

[11] Patent Number: 4,968,081
[45] Date of Patent: Nov. 6, 1990

[54] NON-CONTACT ACTUATOR

[75] Inventors: Timothy Beight, Amherst; Richard Grabowski, Garfield Heights, both of Ohio

[73] Assignee: Hall Processing Systems, Westlake, Ohio

[21] Appl. No.: 322,528

[22] Filed: Mar. 13, 1989

[51] Int. Cl.⁵ ............................................. B65G 47/86
[52] U.S. Cl. ........................................ 294/104; 294/88; 271/204; 271/901; 198/470.1
[58] Field of Search .............. 294/88, 104; 198/470.1, 198/803.7; 271/18.1, 193, 204, 205, 901

[56] References Cited

U.S. PATENT DOCUMENTS

| | | | |
|---|---|---|---|
| 3,140,031 | 7/1964 | Fitch | 226/109 |
| 3,520,459 | 7/1970 | McCrady | 226/160 |
| 3,873,014 | 3/1975 | Matsuhisa | 226/162 |
| 4,138,102 | 2/1979 | Palmer | 271/901 X |
| 4,284,301 | 8/1981 | Geiger et al. | 294/104 |
| 4,307,801 | 12/1981 | Hansch | 271/204 X |
| 4,381,056 | 4/1983 | Eberle | 294/104 X |
| 4,541,771 | 9/1985 | Beni et al. | 414/786 X |
| 4,614,288 | 9/1986 | Torres | 226/165 |
| 4,662,620 | 5/1987 | Hechler et al. | 271/901 X |
| 4,681,213 | 7/1987 | Winiasz | 294/104 X |
| 4,746,007 | 5/1988 | Houseman | 271/204 X |

*Primary Examiner*—Russell D. Stormer
*Attorney, Agent, or Firm*—Fay, Sharpe, Beall, Fagan, Minnich & McKee

[57] ABSTRACT

A non-contact actuator assembly for a newspaper gripper includes a magnet disposed on a gripper release arm. The release arm passes beneath an electromagnet disposed adjacent the workpath of the gripper. The position of the gripper is sensed and a suitable signal provided to an associated voltage supply. A pulse width modulated voltage quickly and effectively induces a magnetic field in the electromagnet as the magnet in the release arm passes thereby and the magnetic field collapses quickly so as not to actuate the next gripper. The magnetic field urges the release arm to an actuated position so that opposed clamping jaws of the gripper open to release a gripped sheet product.

21 Claims, 2 Drawing Sheets

NON-CONTACT ACTUATOR

BACKGROUND OF THE INVENTION

This invention pertains to the art of gripper assemblies and actuators therefor, and more particularly to grippers for selectively handling sheet products such as newspapers.

The invention is particularly applicable to a gripper having opposed clamping jaws selectively brought into a closed position and spring biased to an open position upon actuation of a release arm. The invention will be described with particular reference to this embodiment; however, it will be appreciated that the invention has broader applications and may be advantageously employed in actuating related grippers for gripping other products if so desired.

Typically, an article conveyor apparatus for handling sheet products such as newspapers and the like includes a plurality of grippers spaced along an endless chain. Each gripper is adapted to convey an individual newspaper from one work station to another. Each gripper includes first and second clamping jaws initially disposed in spaced relation and adapted for receipt of a newspaper therebetween. At a pickup station, an edge of the newspaper is inserted between the clamping jaws and the clamping jaws then move relative to one another to tightly grip the newspaper for advancement with the endless chain. Each newspaper can thus be handled individually and for further processing or operational steps downstream. At a release or dropoff station, a release lever or arm is engaged by an actuating mechanism to move the release arm to an actuated or opening position thereby permitting the clamping jaws to open relative to one another and release the newspaper from further gripping. For example, the clamping jaws are normally biased to an open position by a spring. When the clamping jaws are closed, energy is stored in the spring while a wrap spring clutch prevents the jaws from opening. The actuating mechanism releases the wrap spring clutch and the energy stored in the spring opens the clamping jaws.

Structures of this type are generally well known in the art as represented by U.S. Pat. No. 4,381,056 to Eberle issued Apr. 26, 1983. As disclosed in the noted patent, a roller surface is selectively moved into the path of the gripper, particularly the release arm, for abutting, physical engagement therewith. This moves the release arm to a detent release or actuated position so that the clamp jaws may be urged to an open position.

Use of a piston or other mechanical member to contact the release arm is conventional in the art. The extremely large number of newspapers or other sheet products being handled and the repetitive use of grippers due to the endless conveyor chain arrangement imposes a great deal of wear and tear on the physical structure of the processing system. The continuous physical contact between the mechanical actuator, typically an air cylinder, and the release arm of the gripper requires replacement of the air cylinder approximately every three to six months under normal operating conditions. Speed of operation is also a constraint with a piston/cylinder arrangement. Moreover, even though the grippers are manufactured for ease of removal from the conveyor chain, servicing or replacement of the mechanical actuating arrangement still constitutes a great deal of down time and unnecessary labor. Thus, either the actuating assembly and/or the grippers are exposed to degradation as a result of the physical contact necessary to release the gripper from a clamped engagement.

SUMMARY OF THE INVENTION

The present invention contemplates a new and improved non-contact actuator for a gripper which overcomes all of the above-referenced problems and others.

According to a more limited aspect of the invention, there is provided a gripper having first and second clamping jaws movable relative to one another. First means is provided to move one clamping jaw relative to the second clamping jaw. Means for releasing the clamping jaws from a gripping position to a release position is also provided. This releasing means includes a magnetic means for urging the releasing means to an actuated position.

According to a further aspect of the invention, the magnetic releasing means includes a first magnet secured to a release arm of the gripper and a second magnet disposed along the path of travel of the gripper for magnetically interacting with the first magnet.

According to a still further aspect of the invention, means for sensing the position of the gripper as it travels along a workpath is provided.

A principal advantage of the invention resides in reduced wear and tear on a gripper and associated actuating mechanism.

Yet another advantage of the invention resides in the increased life and reduced labor costs resulting from use of a non-contact actuator.

Still another advantage resides in the economical, simplified manner of manufacturing new gripper units and/or refitting existing gripper units for use with the non-contact actuator.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
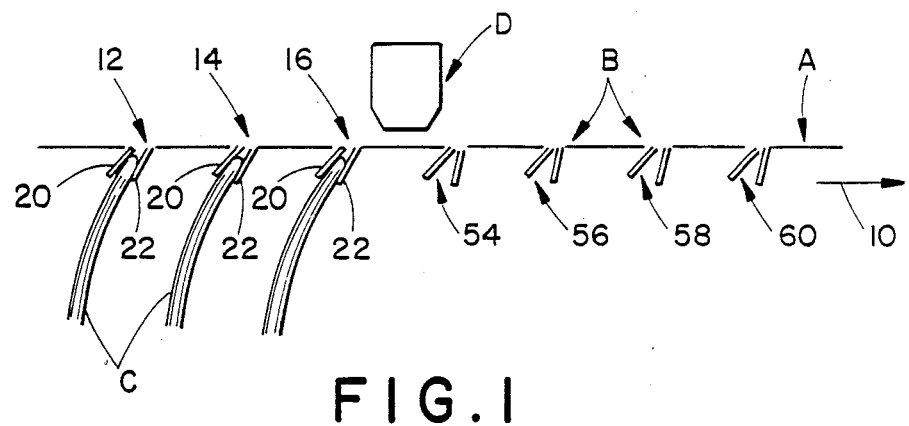
FIG. 1 is a schematic representation of a portion of a conveyor apparatus for handling sheet products and incorporating the subject invention.

Referring now to the drawings wherein the showings are for purposes of illustrating the preferred embodiment of the invention only and not for purposes of limiting same, the FIGURES show an endless conveyor chain A having plural grippers B spaced therealong and carrying sheet products such as newspapers C. A non-contact actuator D cooperates with the grippers to urge the grippers to a position for selective release of the newspapers.

More particularly, the endless conveyor chain A includes a predetermined number of grippers B in axially spaced relation for conveying sheet products from one work station to another. For example, newspapers are printed at a high rate of speed and exit a printing station in closely spaced relation. A conveyor or alternative conventional structure may be utilized to orient the newspapers in a shingled or imbricated form. The conveyor (not shown) is typically disposed closely adjacent a conveyor chain A along a portion of its workpath and the individual grippers disposed for receipt of a newspaper therein. Opposed clamping jaws are angularly disposed to receive a newspaper and through a preselected, timed arrangement the jaws are actuated to a closed position for gripping the newspaper. The gripper then conveys a newspaper away from the remaining newspapers in the imbricated stream. This further separates the newspapers for ease of handling by downstream equipment.

Figure 2:
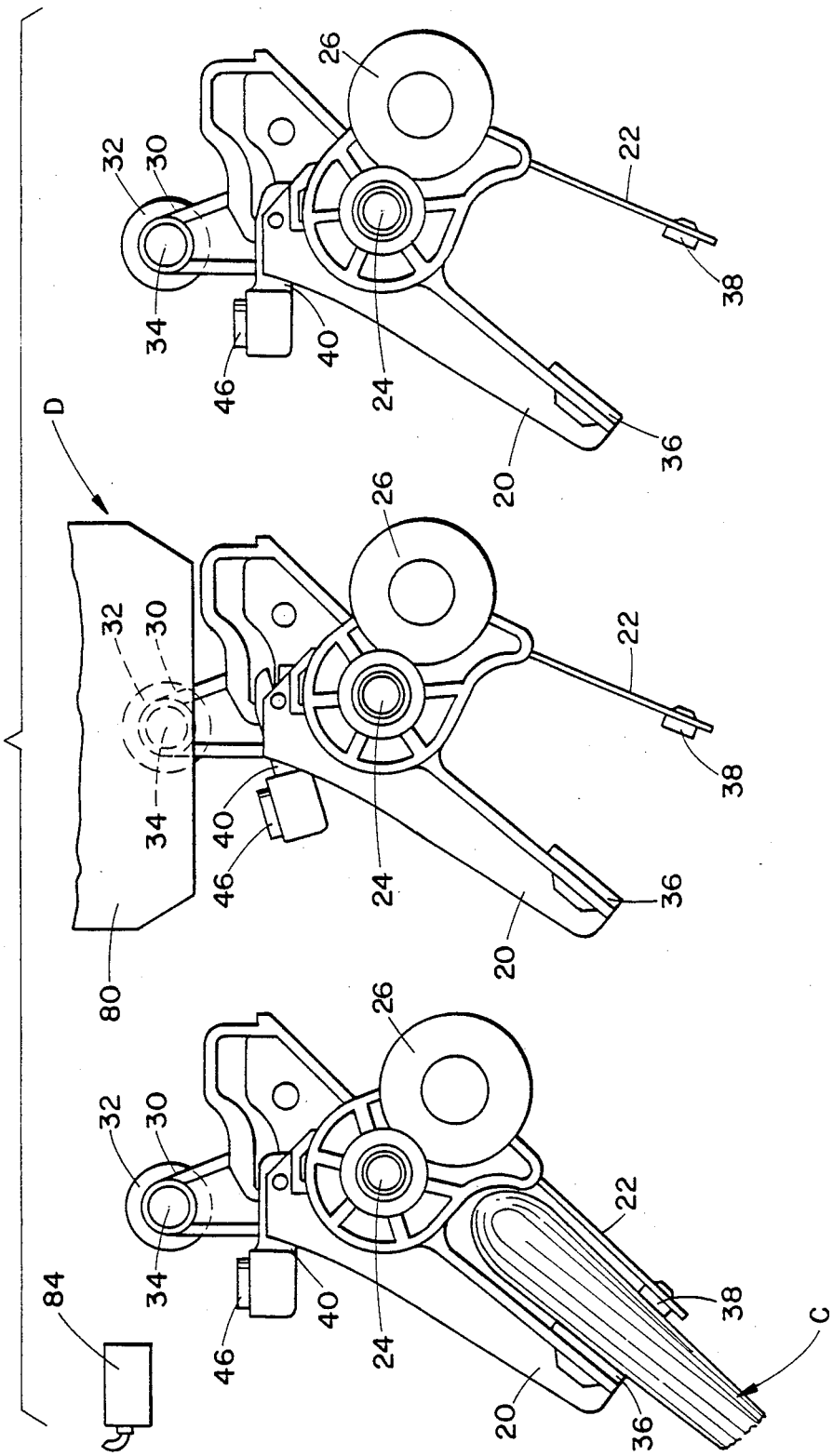
FIG. 2 is an enlarged, detailed view of a non-contact actuator of the subject invention.

With particular reference to FIGS. 1 and 2, the conveyor chain A is shown advancing rightwardly along a substantially linear path as indicated by arrow 10. One of ordinary skill in the art will understand that other path configurations may be involved and that the linear path is shown merely for ease of illustration. Individual grippers 12, 14, 16 are in closed positions and advancing toward the non-contact actuator D. Each gripper includes first and second clamping jaws 20, 22 closely spaced together and in a closed position gripping an individual newspaper C. The clamping jaws are received on a hub or main shaft 24 that defines the axis of rotation of the clamping jaws relative to one another. In the particular arrangement shown, clamping jaw 20 of each gripper remains generally stationary while clamping jaw 22 is actuated to open and closed positions relative thereto as will be described further below.

A means for advancing the first and second clamping jaws toward a closed position includes roller 26. The roller is operatively connected to the second clamping jaw so that rotation of the roller around the shaft in a clockwise direction as shown will advance clamping jaw 22 into closed relation with clamping jaw 20. For example, this closing action can be achieved by disposing the roller in an associated track (not shown) adjacent the operating path of the conveyor chain. Predetermined changes in the path of the track relative to the conveyor chain path will rotate the roller which, in turn, rotates the second clamping jaw 22 to a closed position. Once disposed in a closed position, the roller may continue to ride in the track or, preferably, the track terminates and the roller is free for rotation about shaft 24 as desired.

A gripper pivot arm 30 is secured to the first clamping jaw to selectively pivot the entire gripper around shaft 24. In much the same manner as roller 26, the pivot arm may include a roller 32 on shift 34 or smooth surface that cooperates with a second, associated track (not shown) to selectively rotate or pivot the entire gripper around shaft 24. This pivoting or rotational action of the entire gripper may be necessary to orient the gripper and/or newspaper for preselected processing operations. In the preferred embodiment, the pivot arm is not constrained by the associated second track except in those regions where pivoting action is desired. Moreover, the rotation of the entire gripper does not effect the gripping action of the first and second clamping jaws.

A wrap spring clutch arrangement is used to maintain the second clamping jaw in a closed position relative to the first clamping jaw 20. One of the clamping jaws freely receives the shaft 24 therethrough while the other clamping jaw rotates with the shaft. The spring clutch maintains a first diameter that wraps closely around shaft 24 or a portion thereof to constrain rotation of the one clamping jaw relative to the main shaft in one direction. Alternatively, the other clamping jaw includes a generally cylindrical portion closely received in the spring clutch and has one end of the spring clutch secured thereto. Since the other clamping jaw is secured to the shaft, limiting rotation of the one clamping jaw relative to the other clamping jaw in one direction achieves the gripping action. Enlarging the diameter of the spring clutch permits free rotation of the clamping jaws relative to one another. Further description of the structure and operation of spring clutches in this environment may be found in U.S. Pat. No. 4,681,213, details of the spring clutch being incorporated herein by reference for purposes of brevity. Resilient pads 36, 38 may also be provided on each of the jaws 20, 22, respectively, to facilitate gripping, non-tearing holding of a newspaper.

Extending outwardly from one of the clamping jaws, in this case the first clamping jaw, is a release lever or arm 40 rotatable around pin 42. An outer end 44 of the release arm includes a permanent magnet 46 defining a portion of the magnetic, non-contact release means or actuator D. With additional reference to FIG. 3, an inner end 48 of the release arm includes an extending flange 50 for cooperation with one end of the spring clutch described above that maintains the first and second clamping jaws 20, 22 in a preselected relation. One end of the spring clutch is secured to one of the clamping jaws while the other end selectively cooperates with the flange 50. The flange 50 selectively engages the associated end of the spring clutch and enlarges the diameter of the spring. Enlarging the diameter, in turn, loosens the constraining action on the second clamping jaw and permits free rotation between the first and second clamping jaws as described above.

Figure 3:
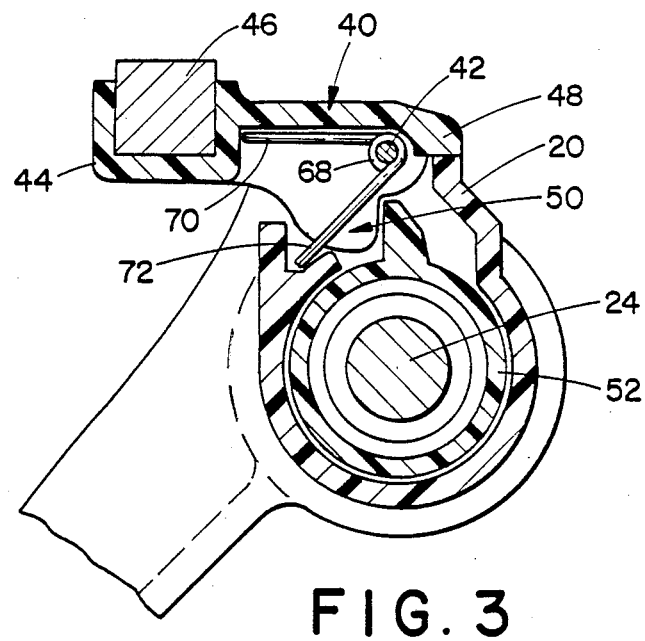
FIG. 3 is a longitudinal sectional view of one of the grippers.

In the preferred embodiment, the flange of the release arm operatively engages the end of the spring clutch through an intermediate member 52. In all other respects, though, the operation of the release arm and spring clutch remains the same. An additional spring (not shown) biases the clamping jaws 20, 22 to an open position when the spring clutch diameter is enlarged and as exemplified by the open position of grippers 54, 56, 58, 60. Thus, and as shown in FIG. 3, the flange 50 of the release arm cooperates with the spring clutch through the intermediate member 52 to permit the first and second clamping jaws to be biased to an open position.

A spring 68 has a first leg 70 and a second leg 72 that operatively engage the first clamping jaw 20 and release arm 40, respectively. As shown, further clockwise rotation of the release arm relative to the first clamping jaw is prohibited by engagement of the inner end 48 with the first clamping jaw. This positions the magnet 46 for cooperation with actuator D as will become more apparent below. Counterclockwise rotation of the release arm is permitted but an actuating force must overcome the bias of spring 68.

According to the preferred embodiment, the force required to overcome the biasing force of spring 68 and rotate the release arm in a counterclockwise direction is provided by electromagnet 80. The electromagnet is disposed closely adjacent the travel path of the conveyor chain and grippers so that the release arm, and particularly magnet 46 carried thereby, is disposed for selective magnetic repulsion sufficient to depress the release arm against the bias of spring 68.

The electromagnet includes a steel core and associated winding therearound through which current is selectively applied. The core and coil operate under known physical principles to create a magnetic field. Supplying current through the winding in one direction establishes a magnetic pole on one end of the electromagnet identical to the magnetic pole of the end of the permanent magnet extending from the release arm Since like poles repel, the permanent magnet is urged away from the electromagnet, the release arm rotates around pin 42 to an actuated position, and the flange 50 enlarges the diameter of the spring clutch through cooperation with intermediate member 52. The grippers continue to travel along the workpath and once the permanent magnet has passed by the induced magnetic field of the electromagnet 80, spring 68 urges the release arm back to a non-actuated position. In this manner, the clamping jaws 20, 22 are released from the gripping position to an open position without physical contact or engagement between an external actuator and the release arm. The effective life of both the actuator and the gripper are increased.

Figure 4:
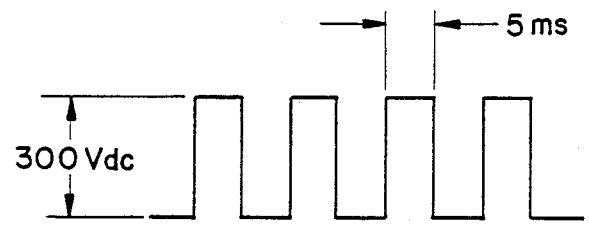
FIG. 4 is a graphical representation of a pulse width modulated voltage supplied to the non-contact actuator.

In order to effectively bias the permanent magnet toward an actuated release position, a large voltage approximating 300 volts for 5 milli-seconds from a switching power supply is pulse width modulated to provide a rectified, 300 volt dc arrangement. This prevents any fluttering or hesitation in the action of the release arm and assures that the release arm is quickly and effectively urged to an actuated position as it passes beneath the electromagnet 80. The rectified voltage is generally illustrated in FIG. 4 and, again, it will be understood by one of ordinary skill in the art that other voltage levels and pulse widths may be utilized to accommodate various applications as required.

Since the electromagnet is not continually supplied with a large voltage, it is necessary to coordinate the voltage supply to the electromagnet with movement of the gripper therebeneath. Means for sensing a position of the gripper is provided. The sensing means may be of any conventional type, i.e., mechanical, electrical, optical, etc., in which the position of the gripper may be selectively monitored by a proximity sensor 84 disposed adjacent the gripper path (FIG. 2). By way of example, the shaft 34 of the pivot arm is metal and leads the release arm by a substantial dimension along the path of the gripper to cooperate with a suitable proximity sensor for indicating the position of the gripper. Alternatively, the main shaft 24 can serve this same function or still another metallic member disposed at a suitable location on the gripper. Since the remaining elements of the gripper are preferably formed from plastic, either shaft 24 or 34 will be readily detected by the proximity sensor.

Since shaft 24 is disposed in leading relation relative to the permanent magnet 46, a signal is provided by the sensing means which provides for a large induced voltage to be supplied to the electromagnet. Induction of the magnetic field quickly reaches a peak value at substantially the same time that the permanent magnet is disposed directly beneath the electromagnet to enhance repulsion of the release arm to the actuated position.

Still another advantage offered by the preferred embodiment is the ability to actuate only selective grippers. The voltage supply to the electromagnet may be pulsed to trip or actuate every other gripper. Still other gripper actuation patterns may be utilized without departing from the scope and intent of the subject invention.

The invention has been described with reference to the preferred embodiment. Obviously modifications and alterations will occur to others upon a reading and understanding of this specification. For example, a metallic member may be disposed in the release arm and the electromagnet used to attract the release arm rather than using the repelling arrangement as described above. This invention is intended to include all such modifications and alterations in so far as they come within the scope of the appended claims or the equivalents thereof.

Having thus described the invention, it is now claimed:

1. A non-contact actuator comprising:
 a gripper having first and second clamping jaws movable relative to one another between open and closed positions, said gripper adapted to selectively receive an associated sheet product between said clamping jaws;
 means operatively connected to said clamping jaws for moving said first clamping jaw toward said closed position with said second clamping jaw;
 means operatively connected to said clamping jaws for releasing said clamping jaws from said closed position to an open position; and,
 magnetic means operatively associated with said releasing means for actuating said clamping jaws to said release position.

2. The actuator assembly as defined in claim 1 wherein said magnetic actuating means includes a first magnet secured to said releasing means.

3. The actuator assembly as defined in claim 2 wherein said magnetic actuating means further includes a second magnet disposed along a path of travel of said gripper for magnetically interacting with said first magnet.

4. The actuator assembly as defined in claim 2 wherein said releasing means includes an arm extending from said gripper and means for biasing said arm to a first non-actuated position.

5. The actuator assembly as defined in claim 3 comprising means for sensing the position of said gripper as it travels relative to said second magnet.

6. The gripper assembly as defined in claim 3 wherein said second magnet is an electromagnet.

7. The actuator assembly as defined in claim 1 wherein said releasing means and magentic actuating means define like poles.

8. The actuator assembly as defined in claim 1 wherein said releasing means and magnetic actuating means define opposite poles.

9. A gripper assembly comprising:
 first and second clamping jaws movable relative to one another between open and closed positions, said clamping jaws adapted to selectively receive an associated sheet product therebetween;

means operatively connected to said clamping jaws for advancing said first clamping jaw toward said second clamping jaw; and releasing means operatively associated with said clamping jaws for selectively releasing said jaws from a closed position to an open position, said releasing means including means mounted and adapted for magnetically interacting with an associated actuator.

10. The gripper assembly as defined in claim 9 further comprising position indicating means defined thereon adapted for cooperating with an associated detection means for indicating the position of the gripper assembly.

11. The griper assembly as defined in claim 9 wherein said releasing means includes a magnet means therein for interaction with an associated actuator.

12. The gripper assembly as defined in claim 11 wherein said releasing means includes an arm extending from one of said clamping jaws, said magnet means being received in said arm.

13. The gripper assembly as defined in claim 12 further comprising means for biasing said arm to a non-actuated position.

14. A non-contact actuator assembly comprising:
a gripper having first and second clamping jaws movable relative to one another between open and closed positions, said gripper adapted to selectively receive an associated sheet product between said clamping jaws;
means operatively connected to said clamping jaws for moving said first clamping jaw toward said closed position with said second clamping jaw;
means operatively connected to said clamping jaws for releasing said clamping jaws from said closed position to an open position;
magnetic means operatively associated with said releasing means for actuating said clamping jaws from said closed position; and,
means for sensing the position of said gripper traveling toward said magnetic actuating means.

15. The actuator assembly as defined in claim 14 wherein said magnetic actuating means includes a first magnet secured to said releasing means.

16. The actuator assembly as defined in claim 14 wherein said sensing means includes a proximity sensor disposed adjacent a path of travel of said gripper and a metallic element on said gripper cooperating therewith to provide a signal representative of the position of said gripper.

17. The actuator assembly as defined in claim 16 wherein said gripper is substantially formed from a nonmetal to prevent interference with said proximity sensor.

18. The actuator assembly as defined in claim 16 wherein said releasing means includes an arm extending from said gripper, said arm trailing said metallic element along the travel path of said gripper.

19. A non-contact actuator assembly comprising:
a gripper having first and second clamping jaws movable relative to one another between open and closed positions, said gripper adapted to selectively receive an associated sheet product between said clamping jaws;
means operatively associated with said clamping jaws for moving said first clamping jaw toward said closed position with said second clamping jaw;
means operatively associated with said clamping jaws for releasing said clamping jaws from said closed position;
magnetic means operatively associated with said releasing means for actuating said clamping jaws from said closed position, said magnetic actuating means including a first magnet secured to said releasing means and a second magnet disposed along a path of travel of said gripper for magnetically interacting with said first magnet, and
means for sensing the position of said gripper traveling toward said magnetic actuating means.

20. A non-contact actuator assembly comprising:
a gripper having first and second clamping jaws movable relative to one another between open and closed positions, said gripper adapted to selectively receive an associated sheet product between said clamping jaws;
means operatively associated with said clamping jaws for moving said first clamping jaw toward said closed position with said second clamping jaw;
means operatively associated with said clamping jaws for releasing said clamping jaws from said closed position;
magnetic means operatively associated with said releasing means for actuating said clamping jaws from said closed, said magnetic actuating means including a first magnet defined on said releasing means and an electromagnet disposed along a travel path of said gripper; and
means for sensing the position of said gripper traveling toward said magnetic actuating means.

21. The actuator assembly as defined in claim 20 wherein said electromagnet is energized in response to a signal representative of the position of said gripper provided by said sensing means.

* * * * *